US012654694B2

(12) United States Patent
Lee et al.

(10) Patent No.: US 12,654,694 B2
(45) Date of Patent: *Jun. 16, 2026

(54) AUTONOMOUS DRIVING CONTROL SYSTEM AND METHOD THEREOF

(71) Applicants:Hyundai Motor Company, Seoul (KR); Kia Corporation, Seoul (KR)

(72) Inventors: Dong Hwi Lee, Seongnam-Si (KR); Keon Chang Lee, Hwaseong-Si (KR); Su Jung Yoo, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 18/758,272

(22) Filed: Jun. 28, 2024

(65) Prior Publication Data

US 2024/0351583 A1     Oct. 24, 2024

Related U.S. Application Data

(63) Continuation of application No. 18/132,234, filed on Apr. 7, 2023, now Pat. No. 12,024,164, which is a
(Continued)

(30) Foreign Application Priority Data

Aug. 3, 2020     (KR) ......................... 10-2020-0096952

(51) Int. Cl.
*B60W 30/09* (2012.01)
*B60N 2/02* (2006.01)
(Continued)

(52) U.S. Cl.
CPC ........... *B60W 30/09* (2013.01); *B60N 2/0276* (2013.01); *B60Q 1/52* (2013.01); *B60Q 9/008* (2013.01);
(Continued)

(58) Field of Classification Search
CPC ..................................................... B60W 30/09
See application file for complete search history.

(56) References Cited

U.S. PATENT DOCUMENTS 8,879,795 B2   11/2014  Stein et al.
9,145,116 B2 *  9/2015  Clarke ................. B62D 15/025
(Continued)

FOREIGN PATENT DOCUMENTS

CN      106030609 A1    10/2016
CN      110371101 A     10/2019
(Continued)

OTHER PUBLICATIONS

May 7, 2021—European Search Report—20207748.3.
Jan. 30, 2023—US Notice of Allowance—U.S. Appl. No. 17/099,988.
Sep. 29, 2022—US Non-Final Rejection—U.S. Appl. No. 17/099,988.

*Primary Examiner* — Michael A Berns
(74) *Attorney, Agent, or Firm* — Banner & Witcoff, Ltd.

(57) ABSTRACT

An autonomous driving control system and a method thereof are provided. The autonomous driving control system includes a strategy performing device that generates and performs a stop strategy of a vehicle on the basis of a target stop location, when a critical situation occurs during autonomous driving, a behavior controller that controls a behavior of the vehicle depending on the stop strategy, and an emergency module controller that runs a predetermined emergency module, when the critical situation occurs.

20 Claims, 9 Drawing Sheets

Related U.S. Application Data continuation of application No. 17/099,988, filed on Nov. 17, 2020, now Pat. No. 11,667,280.

(51) Int. Cl.

| | |
|---|---|
| *B60Q 1/52* | (2006.01) |
| *B60Q 9/00* | (2006.01) |
| *B60W 10/10* | (2012.01) |
| *B60W 10/18* | (2012.01) |
| *B60W 10/20* | (2006.01) |
| *G05D 1/00* | (2006.01) |
| *G05D 1/81* | (2024.01) |
| *B60Q 1/44* | (2006.01) |
| *B60R 21/013* | (2006.01) |
| *B60W 60/00* | (2020.01) |

(52) U.S. Cl.

CPC ............ *B60W 10/10* (2013.01); *B60W 10/18* (2013.01); *B60W 10/20* (2013.01); *G05D 1/0088* (2013.01); *G05D 1/81* (2024.01); *B60Q 1/44* (2013.01); *B60R 21/013* (2013.01); *B60W 60/0015* (2020.02); *B60W 2556/45* (2020.02); *B60W 2710/1005* (2013.01); *B60W 2710/20* (2013.01); *B60W 2720/10* (2013.01); *B60W 2720/12* (2013.01)

(56) References Cited

U.S. PATENT DOCUMENTS

| | | | | |
|---|---|---|---|---|
| 10,086,830 | B2 * | 10/2018 | Myers | B60W 30/085 |
| 10,293,826 | B2 | 5/2019 | Clarke et al. | |
| 10,446,031 | B2 * | 10/2019 | Agnew | B60W 40/04 |
| 10,507,813 | B2 * | 12/2019 | Zhu | B60T 8/58 |
| 10,953,884 | B2 | 3/2021 | Clarke et al. | |
| 11,052,917 | B2 * | 7/2021 | Kim | B60W 50/029 |
| 11,084,490 | B2 | 8/2021 | Kim et al. | |
| 11,173,912 | B2 * | 11/2021 | Yoo | B60W 50/082 |
| 11,198,436 | B2 | 12/2021 | Ravichandran et al. | |
| 11,262,753 | B2 | 3/2022 | Kanoh et al. | |
| 11,492,016 | B2 * | 11/2022 | Yoo | B60W 60/0059 |
| 11,667,280 | B2 * | 6/2023 | Lee | B60N 2/0276 |
| | | | | 701/26 |
| 12,019,443 | B2 * | 6/2024 | Ferguson | G05D 1/0231 |
| 12,024,164 | B2 * | 7/2024 | Lee | B60Q 1/52 |
| 2015/0151725 | A1 | 6/2015 | Clarke et al. | |
| 2017/0334440 | A1 | 11/2017 | Myers et al. | |
| 2018/0268695 | A1 | 9/2018 | Agnew et al. | |
| 2018/0326956 | A1 | 11/2018 | Zhu et al. | |
| 2018/0348757 | A1 | 12/2018 | Mimura et al. | |
| 2019/0217868 | A1 | 7/2019 | Kim et al. | |
| 2019/0315366 | A1 | 10/2019 | Yoo et al. | |
| 2023/0331219 | A1 | 10/2023 | Lee et al. | |
| 2024/0190479 | A1 * | 6/2024 | Chae | B60W 50/10 |
| 2024/0351583 | A1 * | 10/2024 | Lee | B60Q 1/535 |
| 2025/0050906 | A1 * | 2/2025 | Lee | B60W 60/0011 |

FOREIGN PATENT DOCUMENTS

| | | | |
|---|---|---|---|
| DE | 102010055943 | A1 | 8/2011 |
| DE | 102014006261 | A1 | 9/2014 |
| EP | 3375681 | A1 | 9/2018 |
| EP | 3552901 | A2 | 10/2019 |
| KR | 10-2020-0072581 | A | 6/2020 |

* cited by examiner

```
<CONTROL FIRST EMERGENCY MODULE>
• TURN ON BRAKE LIGHT
• TURN ON  HAZARD LIGHT
• TURN ON EXTERIOR LIGHT (OPTIONAL)
```

Fig.4A

```
<CONTROL SECOND EMERGENCY MODULE>
• SHIFT TO P STAGE
• COUPLE PARK BRAKE
• UNLOCK DOOR LOCK
• CONNECT E-CALL
• MOVE SEAT POSITION (OPTIONAL)
• OPERATE SURROUNDING
  IMAGE DISPLAY DEVICE (OPTIONAL)
```

Fig.4B

```
<CONTROL THIRD EMERGENCY MODULE>
• SHIFT TO N STAGE
• RELEASE PARK BRAKE
• LOCK DOOR LOCK
• PULL SEAT BELT
```

Fig.4C

AUTONOMOUS DRIVING CONTROL SYSTEM AND METHOD THEREOF

CROSS-REFERENCE TO RELATED APPLICATION

This application is a continuation of U.S. application Ser. No. 18/132,234, filed Apr. 7, 2023, which is a continuation of U.S. application Ser. No. 17/099,988, filed Nov. 17, 2020, which claims priority to and the benefit of Korean Patent Application No. 10-2020-0096952, filed on Aug. 3, 2020, each of which is hereby incorporated by reference in its entirety.

FIELD

The present disclosure relates to an autonomous driving control system and a method thereof.

BACKGROUND

The statements in this section merely provide background information related to the present disclosure and may not constitute prior art.

During autonomous driving, an autonomous vehicle may request its driver to take over the driving control authority. Thus, when the driver accepts the request to take over the driving control authority, the autonomous vehicle is switched to a manual driving mode and thus travels according to driver's manual driving.

Herein, when it is impossible for the driver to accept the request to take over the control authority due to health problems or the like while driving, there may occur a critical situation because the autonomous driving is not switched to the manual driving.

To address the above-mentioned problems, the autonomous vehicle of level 3 recognizes that a critical situation occurs when the driver does not accept the request to take over the control authority although a certain time elapses and controls the vehicle to automatically stop on a safe location.

However, when there is no special countermeasure after the vehicle stops and when an autonomous driving mode is released after the vehicle stops, an accident may be caused in a situation where the driver does not correspond to the manual driving.

SUMMARY

The present disclosure has been made to solve the above-mentioned problems occurring in the prior art while advantages achieved by the prior art are maintained intact.

An aspect of the present disclosure provides an autonomous driving control system for vehicle to guide a vehicle into a lane or a shoulder to stop, when a critical situation occurs during autonomous driving, to reduce or minimize the critical situation and a method thereof.

Another aspect of the present disclosure provides an autonomous driving control system for automatically running a predetermined emergency module depending on a surrounding situation, a critical situation of collision, whether the driver intervenes, or the like, when the vehicle is traveling according to a stop strategy due to a critical situation during autonomous driving, to notify the outside of the critical situation in the vehicle and quickly cope with the critical situation.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, an autonomous driving control system may include a strategy performing device that generates and performs a stop strategy of a vehicle on the basis of a target stop location, when a critical situation occurs during autonomous driving, a behavior controller that controls a behavior of the vehicle depending on the stop strategy, and an emergency module controller that runs a predetermined emergency module, when the critical situation occurs.

The strategy performing device may calculate required deceleration and a required steering angle for stopping the vehicle on the target stop location to generate the stop strategy of the vehicle.

The emergency module controller may control an operation of a predetermined first emergency module, when the stop strategy is performed.

The first emergency module may include at least one of a brake light, a hazard light or an exterior light.

The emergency module controller may control to turn on the first emergency module until the critical situation of the vehicle is resolved.

The emergency module controller may control an operation of a predetermined second emergency module, when a stop state of the vehicle is verified.

The second emergency module may include at least one of a transmission device, a parking brake, a door lock, or E-call.

The second emergency module may further include at least one of a seat or a surrounding image display device.

The emergency module controller may perform a predetermined operation among at least one of shifting a gear of the transmission device to a parking (P) stage, engaging the parking brake, unlocking the door lock, connecting the E-call, moving a position of the seat, or operating the surrounding image display device.

The autonomous driving control system may further include a collision determining device that determines whether a critical situation of a rear-end collision occurs in a state where the vehicle stops.

The collision determining device may recognize a following vehicle and may determine that the critical situation of the rear-end collision occurs when a time to collision (TTC) with the recognized following vehicle is less than or equal to a reference value.

The emergency module controller may control an operation of a predetermined third emergency module, when it is determined that the critical situation of the rear-end collision occurs.

The third emergency module may include at least one of a transmission device, a parking brake, a door lock, or a seat belt.

The emergency module controller may perform a predetermined operation among at least one of shifting the gear of the transmission device to a neutral (N) stage, releasing the parking brake, locking the door lock, or pulling the seat belt.

The emergency module controller may return a control operation of the third emergency module to a previous state, when the critical situation of the rear-end collision is released.

The emergency module controller may end or initialize the running of the emergency module, when the critical situation is released.

According to an aspect of the present disclosure, an autonomous driving control method may include: when a critical situation occurs during autonomous driving of the vehicle, generating and performing, by the emergency module controller, a stop strategy of a vehicle on the basis of a target stop location; controlling, by the emergency module controller, a behavior of the vehicle depending on the stop strategy; and when the critical situation occurs, running, by the emergency module controller, a predetermined emergency module.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIGS. 4A, 4B, 4C, 5, and 6 are drawings respectively illustrating an operation of an autonomous driving control system according to some forms of the present disclosure;

Figure 1:
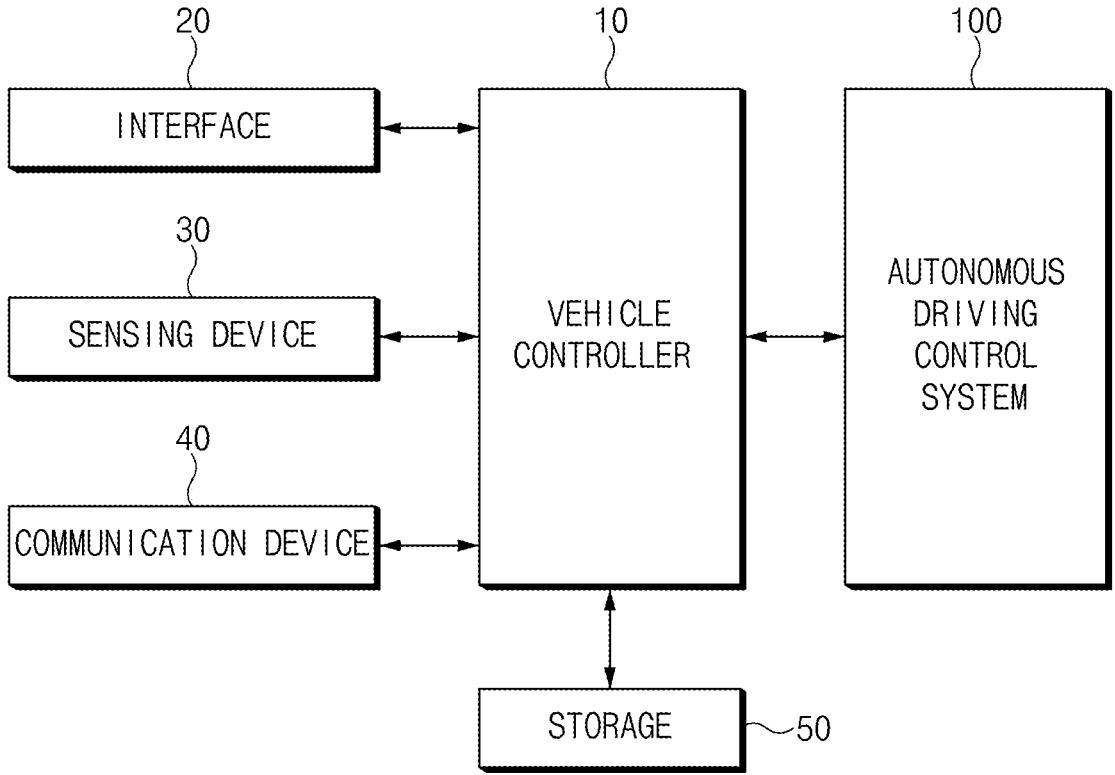
FIG. 1 is a block diagram illustrating a device configuration of a vehicle to which an autonomous driving control system is applied, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a device configuration of a vehicle to which an autonomous driving control system is applied, according to one form of the present disclosure.

Referring to FIG. 1, the vehicle may include a vehicle controller 10, an interface 20, a sensor device 30, a communication device 40, and a storage 50 and may further include an autonomous driving control system 100. Herein, the vehicle controller 10 may process a signal delivered between components or systems of the vehicle.

The interface 20 may include an input means for receiving a control command from a user (driver) and an output means for outputting an operation state, an operation result, or the like of the vehicle.

Herein, the input means may include a key button and may further include a soft key implemented on a display. Furthermore, the input means may further include a mouse, a joystick, a jog shuttle, a stylus pen, or the like.

The output means may include the display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, or a three-dimensional (3D) display.

The sensor device 30 may include one or more sensors which detect obstacles located around the vehicle and measure a distance between the obstacles. As an example, the sensor device 30 may include an ultrasonic sensor, a scanner, a camera, or the like. Of course, in addition, the sensor is applicable of any of sensors capable of detecting an obstacle and measuring a distance.

Meanwhile, the sensor device 30 may further include a sensor for measuring a speed of the vehicle.

The communication device 40 may include a communication module for supporting vehicle network communication with electronics and/or control units provided in the vehicle. Herein, the communication module may include a controller area network (CAN) communication module, a local interconnect network (LIN) communication module, a flex-ray communication module, or the like.

Furthermore, the communication module may include a module for a wireless Internet technology or a module for a short range communication technology. As an example, the communication module may support communication with a specified terminal, a call center, or the like when an E-call module is run.

Herein, the wireless Internet technology may include wireless local area network (WLAN), wireless broadband (WiBro), wireless-fidelity (Wi-Fi), world interoperability for microwave access (WiMAX), or the like.

Furthermore, the short range communication technology may include Bluetooth, ZigBee, ultra-wideband (UWB), radio frequency identification (RFID), infrared data association (IrDA), or the like.

The storage 50 may store data, a command, an algorithm, and/or the like desired for an operation of the vehicle. Herein, the storage 50 may include a storage medium such as a random access memory (RAM), a static RAM (SRAM), a read-only memory (ROM), a programmable ROM (PROM), or an electrically erasable PROM (EEPROM).

The autonomous driving control system 100 may be enabled when operating in an autonomous driving mode and may adjust a steering angle, a speed, or the like of the vehicle depending on a predetermined condition to control a behavior of the vehicle. In this case, the autonomous driving control system 100 may receive information detected by the sensor device 30 from the vehicle controller 10 and may control a behavior of the vehicle based on the received information.

Furthermore, the autonomous driving control system 100 may determine whether a critical situation occurs during autonomous driving. When the critical situation occurs, the autonomous driving control system 100 may generate a stop strategy to reduce or minimize that a more critical situation occurs, such that the vehicle may safely stop in the lane or on a shoulder next to the lane. Herein, the stop strategy may refer to defining control flow of a steering angle, a vehicle speed, and/or the like of the vehicle until the vehicle stops on a target stop location from the current location of the vehicle.

Furthermore, the autonomous driving control system 100 may run a predetermined emergency module 200 to notify the outside of a critical situation in the vehicle after the vehicle stops in the lane or on the shoulder.

The autonomous driving control system 100 according to one form of the present disclosure may be integrally configured with control units in the vehicle or may be implemented as a separate device to be connected with the control units of the device by a separate connection means. Herein, the autonomous driving control system 100 may operate in conjunction with a drive device of the vehicle and may operate in conjunction with a control unit which controls the drive device.

Figure 2:
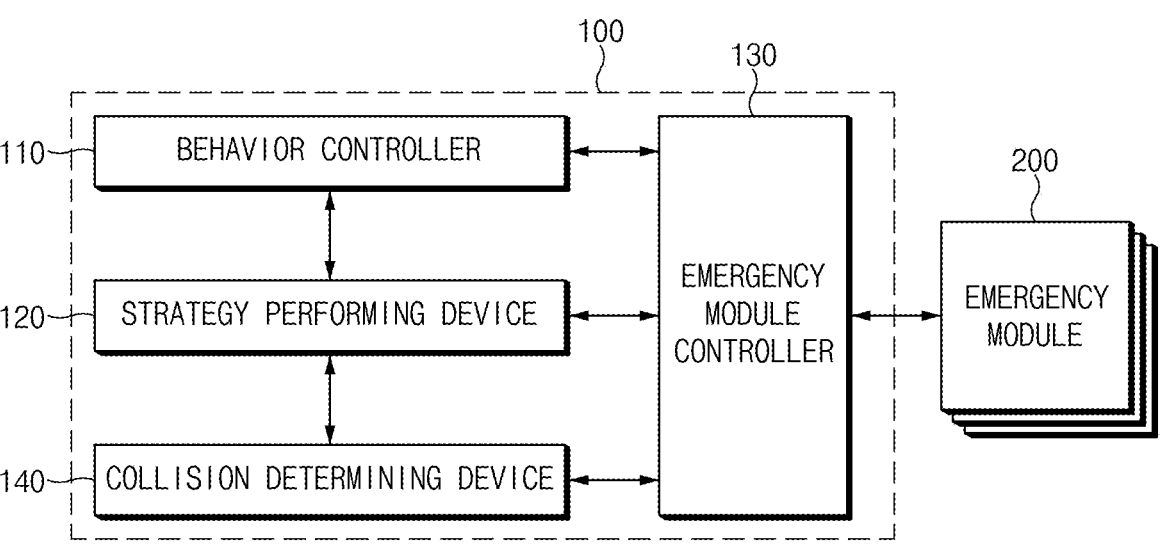
FIG. 2 is a block diagram illustrating a configuration of an autonomous driving control system in one form of the present disclosure.

Thus, a detailed description of a detailed configuration and operation of the autonomous driving control system 100 refer to an exemplary form in FIG. 2.

FIG. 2 is a block diagram illustrating a configuration of an autonomous driving control system according to one form of the present disclosure.

Referring to FIG. 2, an autonomous driving control system 100 may include a behavior controller 110, a strategy performing device 120, an emergency module controller 130, and a collision determining device 140.

The behavior controller 110 may include a steering controller and an acceleration and deceleration controller.

Thus, when autonomous driving of a vehicle is started, the behavior controller 110 may control a behavior of the vehicle by means of the steering controller and the acceleration and deceleration controller depending on a predetermined condition.

As an example, the steering controller may control a steering angle of the vehicle such that the vehicle may travel without departing from the lane along a movement path to a target point. Of course, when there is a need to change the lane, the steering controller may control a steering angle of the vehicle on the basis of a target lane for a lane change. Furthermore, the acceleration and deceleration controller may maintain a predetermined driving speed such that the vehicle may travel. In this case, the acceleration and deceleration controller may control the vehicle to accelerate or decelerate with regard to a relative distance, a relative speed, and the like with a forward vehicle or a following vehicle. Furthermore, the acceleration and deceleration controller may control the vehicle to accelerate or decelerate with regard to a location and/or state of a structure such as an obstacle or a traffic light.

When a critical situation occurs during autonomous driving, the behavior controller 110 may receive the stop strategy generated by the strategy performing device 120. In this case, the behavior controller 110 may control steering and acceleration and deceleration of the vehicle depending on the stop strategy received from the strategy performing device 120 such that the vehicle stops on a target stop location.

When it is determined it is difficult to perform autonomous driving no longer during autonomous driving, the strategy performing device 120 may request a driver of the vehicle to hand over his or her control authority.

When requesting the driver to hand over control authority for driving and when the driver does not accept to hand over the control authority although a set time elapses, the strategy performing device 120 may determine that the critical situation occurs.

As such, when the critical situation occurs during autonomous driving, the strategy performing device 120 may generate a stop strategy for safely stopping the vehicle on the target stop location.

Herein, the strategy performing device 120 may determine the target stop location for stopping the vehicle and may calculate required deceleration and a required steering angle for safely stopping the vehicle on the determined target stop location. The strategy performing device 120 may generate a stop strategy based on the calculated required acceleration and the calculated required steering angle.

The strategy performing device 120 may determine the target stop location in the lane on which the vehicle is traveling. Meanwhile, the strategy performing device 120 may determine a shoulder next to the lane on which the vehicle is traveling as the target stop location. In this case, the strategy performing device 120 may determine the target stop location with regard to a location of the lane where the vehicle is traveling, a situation where surrounding vehicles in the lane are traveling, a shoulder situation, and/or the like.

When the stop strategy is generated, the strategy performing device 120 may deliver the generated stop strategy to the behavior controller 110 and may require the behavior controller 110 to perform the stop strategy.

When the critical situation occurs during autonomous driving, the emergency module controller 130 may run the predetermined emergency module 200.

Herein, the emergency module 200 may be a module provided in the vehicle, which corresponds to modules for notifying the outside that an emergency operation is being performed according to the occurrence of the critical situation.

As an example, the emergency module 200 may include a brake light, a hazard light, an exterior light, a transmission device, a parking brake, a door lock, E-call, a seat, a surrounding image display device, a seat belt, and/or the like. Herein, the exterior light may include a puddle light (or lamp), and the transmission device may include a transmission of a general vehicle and a button-type transmission device for converting a parking (P) stage, a reverse (R) stage, a neutral (N) stage, and a drive (D) stage in an electric vehicle.

When the stop strategy is performed due to the occurrence of the critical situation during the autonomous driving, the emergency module controller 130 may output an operation control command to a predetermined first emergency module.

As an example, the emergency module controller 130 may control an operation of a brake light, a hazard light, an exterior light, and/or the like to notify surrounding vehicles that the vehicle is in an emergency situation.

Furthermore, when the vehicle stops due to the performance of the stop strategy, the emergency module controller 130 may output an operation control command to a predetermined second emergency module to cope with the critical situation.

As an example, the emergency module controller 130 may control an operation of a transmission device, a parking brake, a door lock, E-call, a seat, and/or the like a surrounding image display device.

Furthermore, when it is determined that the critical situation of the rear-end collision occurs by the collision determining device 140, the emergency module controller 130 may output an operation control command to a predetermined third emergency module to cope with the situation of the rear-end collision.

As an example, the emergency module controller 130 may control an operation of a transmission device, a parking brake, a door lock, and/or a seat belt.

In this case, when the critical situation of the real-end collision is released, the emergency module controller 130 may return a control operation of the third emergency module to a previous state.

Figure 3:
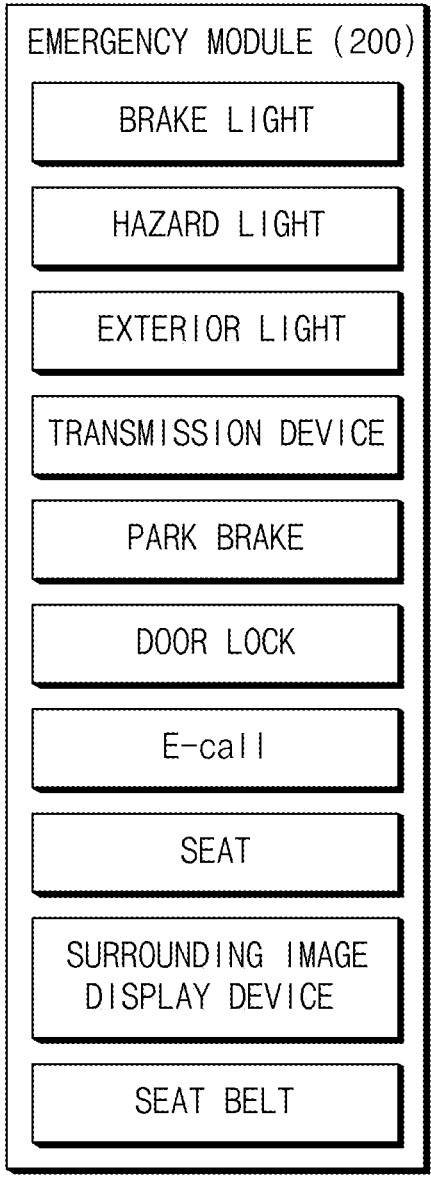
FIG. 3 is a block diagram illustrating an emergency module of a vehicle according to one form of the present disclosure.

A detailed description of the emergency module 200 and the control operation of the emergency module 200 refers to the forms of FIGS. 3, 4A, 4B, and 4C. FIG. 3 is a drawing illustrating an emergency module of a vehicle according to one form of the present disclosure.

Referring to FIG. 3, an emergency module 200 may include a brake light, a hazard light, an exterior light, a transmission device, a parking brake, a door lock, E-call, a seat, a surrounding image display device, a seat belt, and/or the like.

FIG. 4A illustrates a control operation of a first emergency module.

Referring to FIG. 4A, a brake light may be the first emergency module, which may be turned on from a time when a stop strategy for reducing or minimizing risk is s performed and may continue maintaining the turn-on until a critical situation is resolved. In this case, the brake light may continue maintaining the turn-on state although the brake is not operated after the vehicle stops according to the stop strategy. In this case, the brake light may be a mandatory option, which may be set to the first emergency module.

The hazard light may be the first emergency module, which may be turned on from a time when the stop strategy for reducing risk is performed and may continue maintaining the turn-on until the critical situation is resolved after the vehicle stops according to the stop strategy. In this case, the hazard light may be a mandatory option, which may be set to the first emergency module.

The exterior light may be the first emergency module, which may be turned on from a time when the stop strategy for minimizing risk is performed and may continue maintaining the turn-on until the critical situation is resolved. In this case, the exterior light may be a selective option of a user (a driver), which may be set to the first emergency module.

Figure 5:
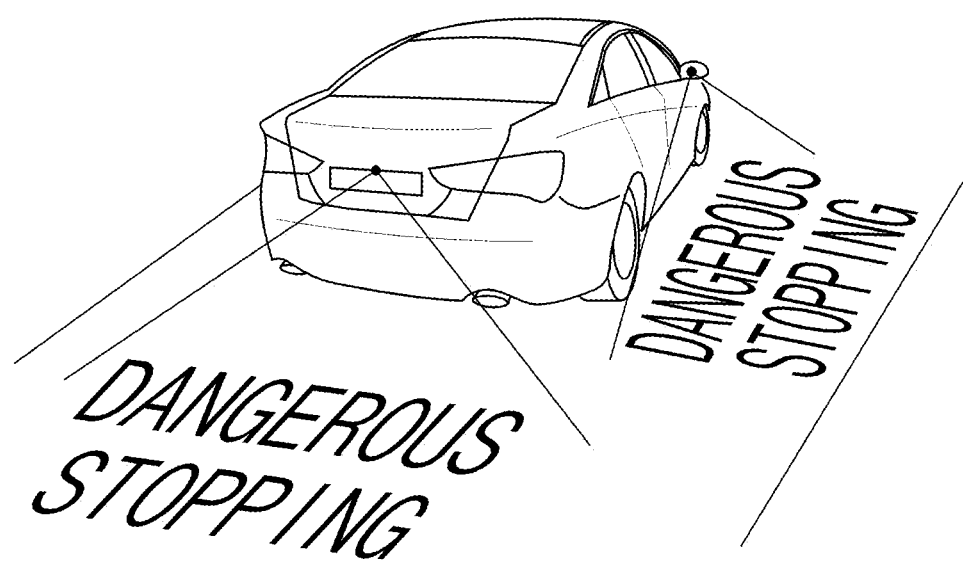

Herein, the exterior light may be used to notify a following vehicle approaching from the rear of a location where the vehicle stops as fast as possible. In this case, the user (the driver) may set words notified through the exterior light, such that the set words of guidance may be displayed on a predetermined location when the exterior light is turned on. As an example, the words of guidance may be set to words, such as "dangerous stopping", providing a notification of a critical situation. Another form of turning on the exterior light refers to FIG. 5.

FIG. 4B illustrates a control operation of a second emergency module.

Referring to FIG. 4B, a transmission device may be the second emergency module, which may operate under control of an emergency module controller 130 after a stop state of the vehicle is verified due to the performance of a stop strategy. Herein, the transmission device may be the shift by wire system, which may shift the gear in an electronic mode.

As an example, when the stop state of the vehicle is verified, the transmission device may automatically shift the gear to the P stage under control of the emergency module controller 130.

Meanwhile, when a critical situation of a rear-end collision occurs, the transmission device may operation as a third emergency module. In this case, the transmission device may automatically shift the gear to the N stage under control of the emergency module controller 130. Herein, when shifting the gear from the P stage to the N stage when the critical situation of the rear-end collision occurs, the transmission device may reduce or minimize an impact to the rear-end collision. When the critical situation of the rear-end collision is released, the transmission device may automatically shift the gear from the N stage to the P stage.

In this case, the transmission device may be a mandatory option, which may be set to the second and third emergency modules.

The parking brake may be the second emergency module, which may be engaged such that the vehicle is not moved in a stop state when the transmission device shifts the gear to the P stage.

Meanwhile, when the critical situation of the rear-end collision occurs, the parking brake may operation as the third emergency module. In this case, when the transmission device shifts the gear to the N stage, the parking brake may be released. In this case, the parking brake may be a mandatory option, which may be set to the second and third emergency modules.

The door lock may be the second emergency module, which may operate under control of the emergency module controller 130 after the stop state of the vehicle is verified due to the performance of the stop strategy.

As an example, the door lock may be released after the stop state of the vehicle is verified. Herein, as the transmission device shifts the gear to the P stage, after the parking brake is engaged, the door lock may be unlocked. The critical situation may occur in a state where a driver is unconscious. Thus, to rescue the driver in the outside after the vehicle stops according to the stop strategy, the door lock should be automatically unlocked.

Meanwhile, when the critical situation of the rear-end collision occurs, the door lock may operation as the third emergency module. In this case, the door lock may be locked again to prevent the door from being opened due to the rear-end collision.

In this case, the door lock may be a mandatory option, which may be set to the second and third emergency modules.

The E-call may be the second emergency module, which may transmit a state of the driver to a call center under control of the emergency module controller 130 after the stop state of the vehicle is verified due to the performance of the stop strategy. The E-call may operate only one time when the vehicle stops for the first time due to the performance of the stop strategy. In this case, the E-call may be a mandatory option, which may be set to the second emergency module.

The seat may be the second emergency module, which may move a seat position under control of the emergency module controller 130 after the stop state of the vehicle is verified due to the performance of the stop strategy.

When the driver finishes manual driving, shifts the gear to the P stage, and turns off the ignition, the seat (power seat) may have a function of moving a seat position to the rear to make it easier for the driver to alight from the seat. The critical situation may occur in a state where the driver is unconscious. Thus, to safely rescue the driver in the outside after the vehicle stops according to the stop strategy, the seat may move the seat position to the rear as far as possible. The seat may operate only one time when the vehicle stops for the first time due to the performance of the stop strategy.

In this case, the seat may be a selective option of a user (a driver), which may be set to the second emergency module.

The surrounding image display device may be the second emergency module, which may operate under control of the emergency module controller 130 after the stop state of the vehicle is verified due to the performance of the stop strategy.

The surrounding image display device may capture an image of the rear of the vehicle and a situation around the vehicle using a camera to provide a surrounding image to a monitor. Thus, before the driver alights from the vehicle after the vehicle stops, he or she may recognize the situation around the vehicle through the monitor. In this case, the surrounding image display device may be a mandatory option, which may be set to the second emergency module.

FIG. 4C illustrates a control operation of a third emergency module.

Referring to FIG. 4C, when a critical situation of a rear-end collision occurs due to performance of a stop strategy, as described above, a transmission device may shift the gear to the N stage, a parking brake may be disengaged, and a door lock may be locked.

A seat belt may be the third emergency module, which may pull the belt under control of an emergency module controller 130 for impact relief and safety of a driver when the critical situation of the rear-end collision occurs after the vehicle stops due to the performance of the stop strategy. In this case, the seat belt may be a mandatory option, which may be set to the third emergency module.

When the stop state of the vehicle is verified due to the performance of the stop strategy, a collision determining device 140 of FIG. 2 may determine whether the critical situation of the rear-end collision occurs. In this case, greater risk may be prevented from being generated due to a secondary collision which is unexpected in a situation where an emergency stop of the vehicle is performed.

Figure 6:
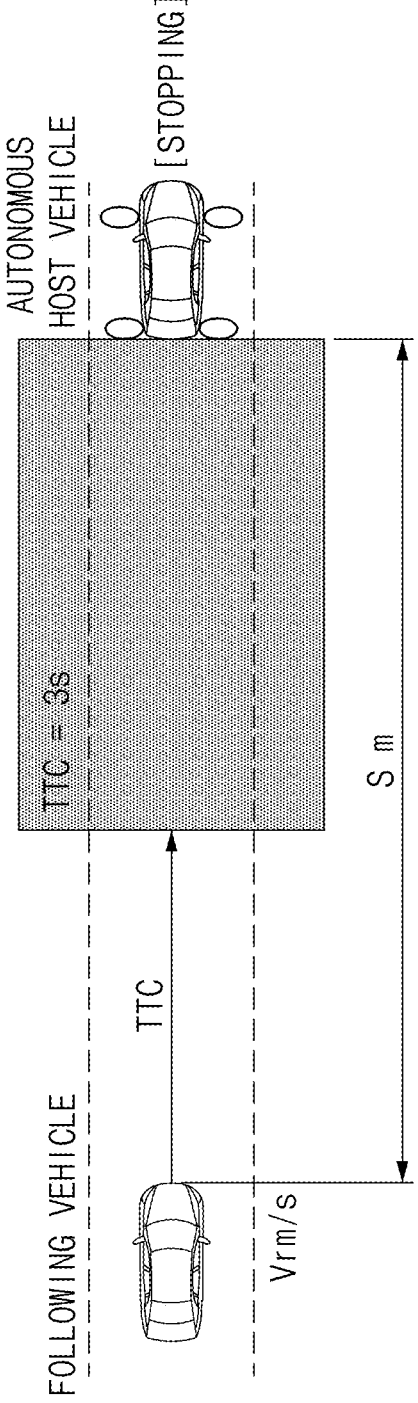

The collision determining device 140 may detect a following vehicle using a heading direction, a location value, and the like of the following vehicle approaching from the rear of the host vehicle. In this case, the collision determining device 140 may predict a collision situation using a speed of the following vehicle, a relative distance between the following vehicle and the host vehicle, and the like and may determine a collision risk. Thus, a detailed description of the operation of determining the occurrence of the critical situation of the rear-end collision refers to FIG. 6. FIG. 6 is a drawing illustrating one form referenced to describe an operation of an autonomous driving control system in one form of the present disclosure.

Referring to FIG. 6, a collision determining device 140 of FIG. 2 may calculate a time to collision (TTC) with reference to Equation 1 below and may determine a critical situation of collision with a following vehicle based on the calculated TTC.

$$TTC = S/Vr \qquad \text{[Equation 1]}$$

In Equation 1 above, TTC denotes the time to collision, S denotes the distance between the host vehicle and the following vehicle, and Vr denotes the speed of the following vehicle.

The collision determining device 140 may calculate a TTC between the host vehicle and the following vehicle using Equation 1 above and may determine that a critical situation of collision occurs when the calculated TTC is less than or equal to a reference value.

As an example, when the TTC is less than or equal to 3 seconds, the collision determining device 140 may determine that the critical situation of collision occurs.

Thus, when it is determined that the critical situation of collision occurs, the collision determining device 140 may deliver it to an emergency module controller 130 of FIG. 2. Thus, the emergency module controller 130 may control an operation of the above-mentioned third emergency module to cope with the critical situation of collision.

Meanwhile, when it is determined that the critical situation is released due to an operation of the driver or the like, the emergency module controller 130 may end or initialize an operation of a first, second, and/or third emergency module.

The autonomous driving control system 100 according to one form of the present disclosure, which performs the above-mentioned operations, or a behavior controller 110, a strategy performing device 120, the emergency module controller 130, and the collision determining device 140 of the autonomous driving control system 100 may be implemented in the form of independent hardware or may be implemented in the form of being included in another hardware device, such as a microprocessor or a universal computer system, as at least one or more processors.

A description will be given in detail of operation flow of the device according to one form of the present disclosure, having the above-mentioned configuration.

Figure 7:
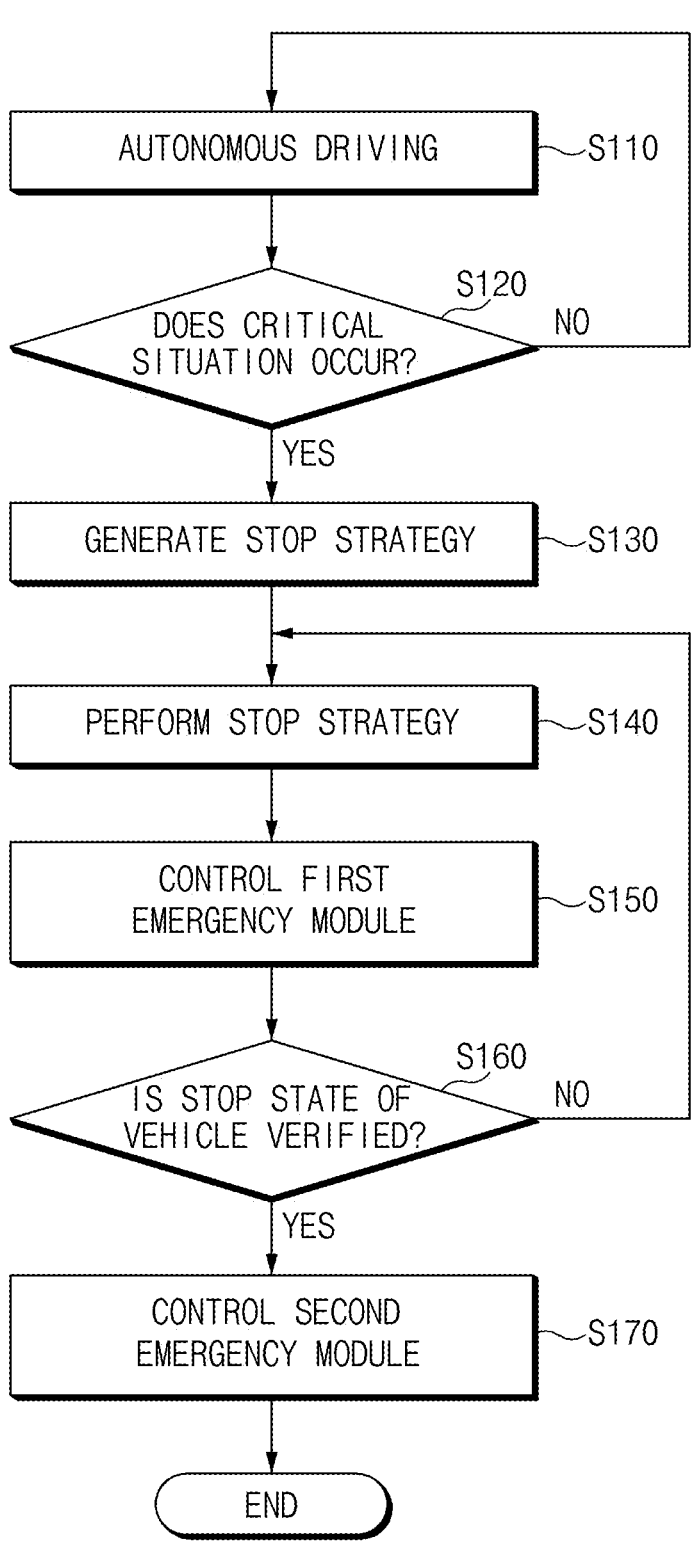
FIGS. 7 and 8 are operational flowcharts illustrating an autonomous driving control in one form of the present disclosure.
Figure 8:
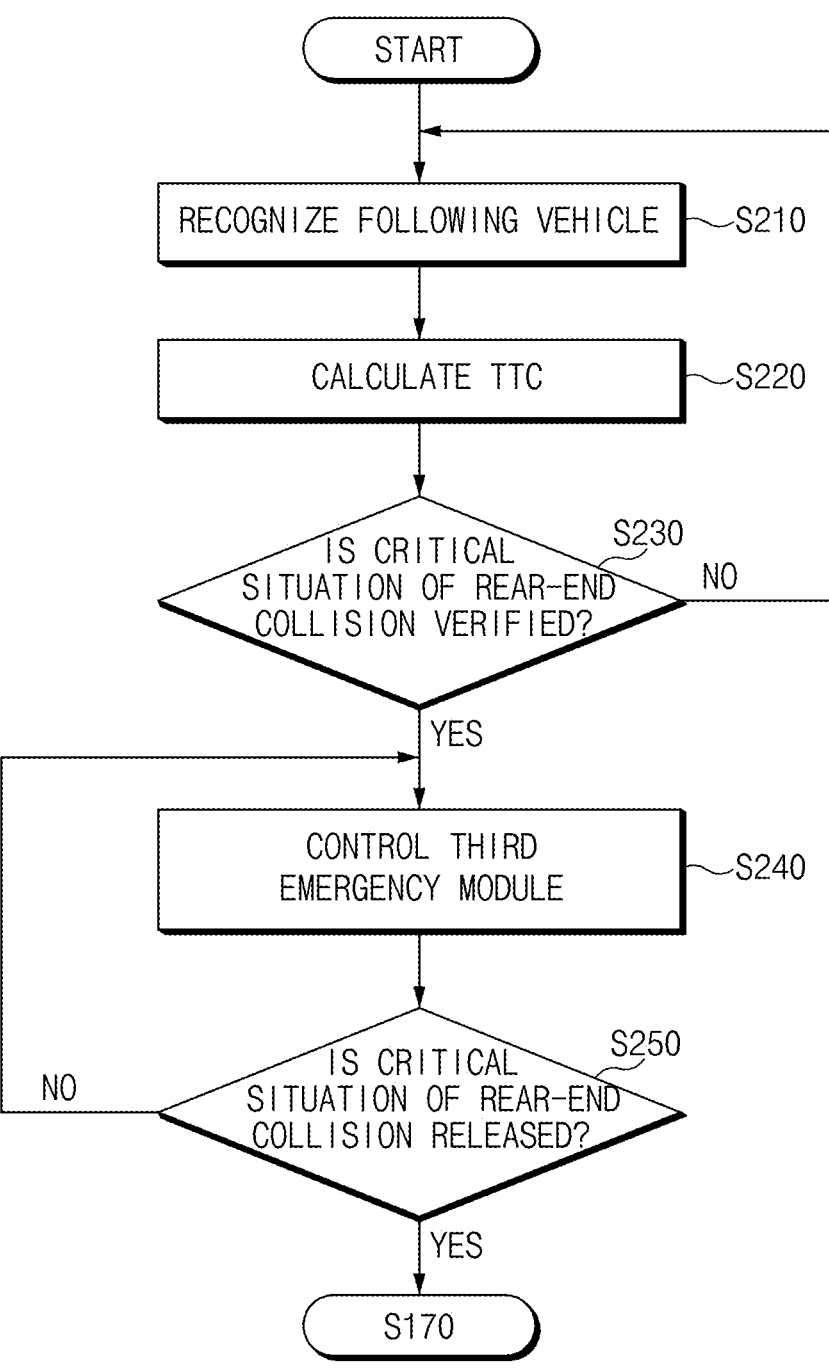

FIGS. 7 and 8 are operational flowcharts illustrating an autonomous driving control method in one form of the present disclosure.

Referring to FIG. 7, in S110, an autonomous driving control system 100 of FIG. 2 may perform autonomous driving of a vehicle. At this time, when a critical situation occurs in S120, in S130, the autonomous driving control system 100 may determine a target stop location on which the vehicle may safely stop and may generate a stop strategy on the basis of the determined target stop location. In S140, the autonomous driving control system 100 may perform the stop strategy generated in S130 to stop the vehicle on the target stop location.

In this case, while performing the stop strategy in S140, in S150, the autonomous driving control system 100 may control an operation a predetermined first emergency module. In S150, the autonomous driving control system 100 may control to turn on a brake light, a hazard light, and/or an exterior light.

Thereafter, when the stop state of the vehicle is verified in S160, in S170, the autonomous driving control system 100 may control an operation of a predetermined second emergency module. In S170, the autonomous driving control system 100 may control an operation of a transmission device, a parking brake, a door lock, E-call, a seat, and/or a surrounding image display device. As an example, the autonomous driving control system 100 may shift the gear stage to the P stage, may engage the parking brake, may unlock the door lock, and connect to a call center through the E-call to deliver a state of a driver. Furthermore, the autonomous driving control system 100 may control to move a seat position to the rear depending on a selective option of the driver and to display a surrounding image on a monitor by means of the surrounding image display device.

Thereafter, the autonomous driving control system 100 may monitor a critical situation of a rear-end collision in a state where the vehicle stops and may perform an operation for coping with the critical situation.

Referring to FIG. 8, in S210, the autonomous driving control system 100 may recognize a following vehicle by means of a sensor device or the like after the vehicle stops. In S220, the autonomous driving control system 100 may calculate a TTC with regard to a distance between the recognized following vehicle and a host vehicle, a speed of the following vehicle, and the like. In this case, when the TTC is less than or equal to a reference value, the autonomous driving control system 100 may determine that the critical situation of the rear-end collision occurs.

When the critical situation of the rear-end collision is verified in S230, in S240, the autonomous driving control system 100 may control an operation of a third emergency module to cope with the rear-end collision. In S240, the autonomous driving control system 100 may control an operation of a transmission device, a parking brake, a door lock, and/or a seat belt. As an example, the autonomous driving control system 100 may control to shift the gear stage to the N stage, disengage the parking brake, lock the door lock, and pull the seat belt.

Thereafter, when the critical situation of the rear-end collision is released in S250, the autonomous driving control system 100 may return to S170 of FIG. 7 to return to the state where the second emergency module is controlled.

Figure 9:
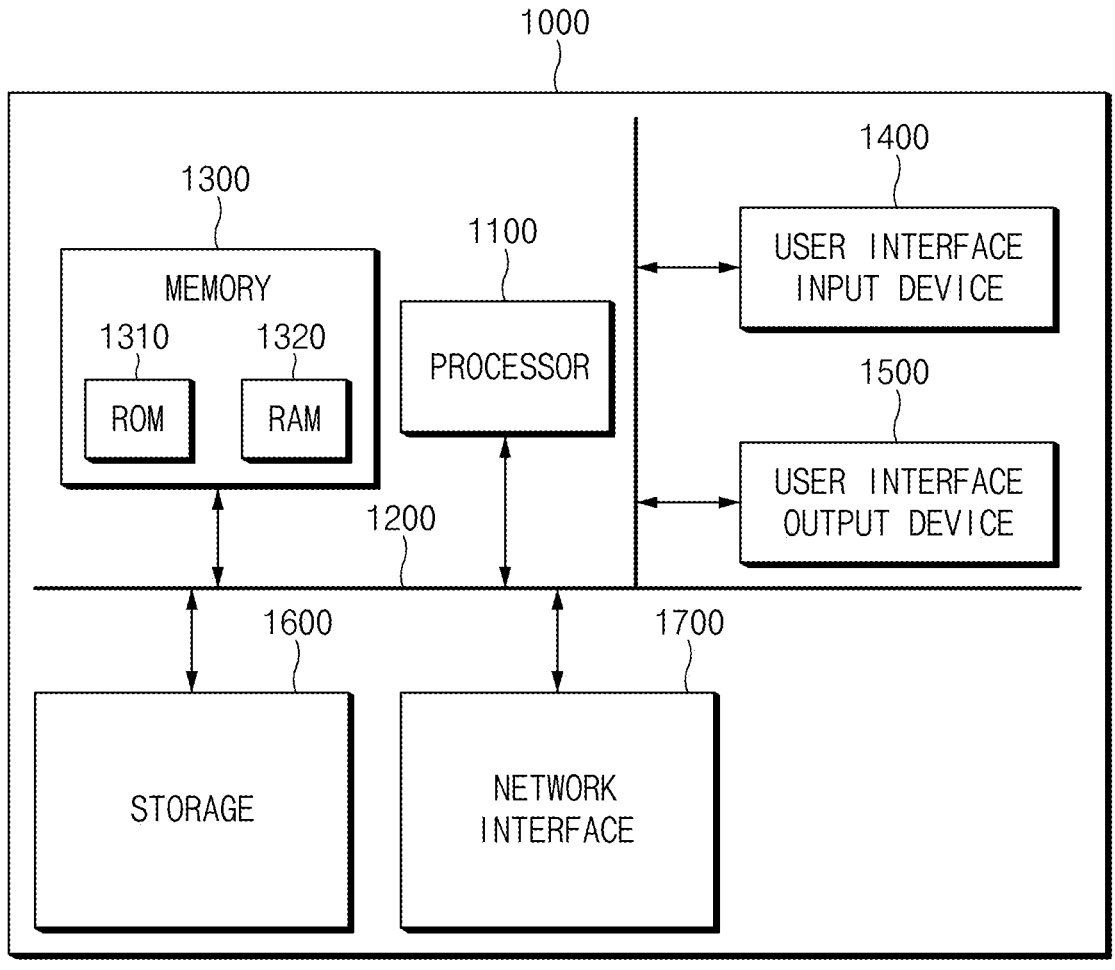
FIG. 9 is a block diagram illustrating a computing system for executing the method according to one form of the present disclosure.

FIG. 9 is a block diagram illustrating a computing system for executing the method according to another form of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (1310) (Read Only Memory) and a RAM (1320) (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to one form of the present disclosure, the autonomous driving control system may guide the vehicle into a lane or a shoulder to stop when a critical situation occurs during autonomous driving.

Furthermore, according to another form of the present disclosure, the autonomous driving control system may automatically run a predetermined emergency module depending on a surrounding situation, a critical situation of collision, whether the driver intervenes, or the like, when the vehicle is traveling according to a stop strategy due to a critical situation during autonomous driving, thus notifying the outside of the critical situation in the vehicle and quickly coping with the critical situation.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An autonomous driving control system comprising:
a memory storing program instructions; and
a processor configured to execute the program instructions, wherein the program instructions, when executed, are configured to:
generate, based on a target stop location and based on a situation occurring during autonomous driving of a vehicle, a stop strategy for the vehicle;
control, based on the stop strategy, a movement of the vehicle; and
operate, during a performance of the stop strategy, a first emergency module comprising a brake light,
wherein the brake light is configured to operate for the stop strategy while operating the first emergency module.

2. The autonomous driving control system of claim 1, wherein the program instructions, when executed, are further configured to:
calculate a deceleration and a steering angle for stopping the vehicle on the target stop location to generate the stop strategy for the vehicle.

3. The autonomous driving control system of claim 1, wherein the program instructions, when executed, are further configured to:
maintain an activated state of the first emergency module until the situation of the vehicle is resolved, and wherein the situation is a situation occurring in a state in which a driver of the vehicle is unconscious.

4. The autonomous driving control system of claim 1, wherein the program instructions, when executed, are further configured to:

control, based on a stop state of the vehicle being verified, an operation of a second emergency module and at least one component of the second emergency module.

5. The autonomous driving control system of claim 4, wherein the second emergency module comprises at least one of: a transmission device, a parking brake, a door lock, or E-call, or any combination thereof.

6. The autonomous driving control system of claim 4, wherein the second emergency module further comprises at least one of: a seat, or a surrounding image display device, or any combination thereof.

7. The autonomous driving control system of claim 4, wherein the program instructions, when executed, are further configured to:

perform at least one of: shifting a gear of a transmission device to a parking stage, engaging a parking brake, unlocking a door lock, connecting E-call, moving a position of a seat, or operating a surrounding image display device, or any combination thereof.

8. The autonomous driving control system of claim 1, wherein the program instructions, when executed, are further configured to:

determine whether a critical situation of a rear-end collision is expected to occur in a state where the vehicle stops.

9. The autonomous driving control system of claim 8, wherein the program instructions, when executed, are further configured to:

recognize a following vehicle; and determine, based on a time to collision (TTC) with the recognized following vehicle being less than or equal to a reference value, that the critical situation of the rear-end collision is expected to occur.

10. The autonomous driving control system of claim 8, wherein the program instructions, when executed, are further configured to:

control, based on the critical situation of the rear-end collision being expected to occur, an operation of a third emergency module and at least one component of the third emergency module.

11. The autonomous driving control system of claim 10, wherein the third emergency module comprises at least one of: a transmission device, a parking brake, a door lock, or a seat belt, or any combination thereof.

12. The autonomous driving control system of claim 10, wherein the program instructions, when executed, are further configured to:

perform at least one of: shifting a gear of a transmission device to a neutral stage, releasing a parking brake, locking a door lock, or pulling a seat belt, or any combination thereof.

13. The autonomous driving control system of claim 10, wherein the program instructions, when executed, are further configured to:

deactivate, based on the critical situation of the rear-end collision being released, a control operation of the third emergency module.

14. The autonomous driving control system of claim 1, wherein the program instructions, when executed, are further configured to:

end or initialize, based on the situation being released, operation of the first emergency module.

15. The autonomous driving control system of claim 1, wherein the first emergency module further comprises an exterior light as a selective option of a user.

16. An autonomous driving control method comprising:

based on a target stop location and based on a situation occurring during autonomous driving of a vehicle, generating, by a processor, a stop strategy for the vehicle;

based on the stop strategy, controlling, by the processor, a movement of the vehicle; and during a performance of the stop strategy, operating, by the processor, a first emergency module comprising a brake light, wherein the brake light is operating for the stop strategy while operating the first emergency module.

17. The autonomous driving control method of claim 16, further comprising:

based on the stop strategy being performed, controlling, by the processor, an operation of the first emergency module; and based on a stop state of the vehicle being verified, controlling, by the processor, an operation of a second emergency module.

18. The autonomous driving control method of claim 16, further comprising:

determining, by the processor, whether a critical situation of a rear-end collision is expected to occur in a state where the vehicle stops;

in response to determining that the critical situation of the rear-end collision is expected to occur, controlling, by the processor, an operation of a third emergency module; and based on the critical situation of the rear-end collision being released, deactivating, by the processor, a control operation of the third emergency module.

19. The autonomous driving control method of claim 16, further comprising:

based on the situation being released, ending or initializing, by the processor, the operating of the first emergency module, wherein the situation is a situation occurring in a state in which a driver of the vehicle is unconscious.

20. The autonomous driving control method of claim 16, wherein the first emergency module further comprises an exterior light as a selective option of a user.

* * * * *